(12) United States Patent
Graham

(10) Patent No.: US 8,727,654 B2
(45) Date of Patent: May 20, 2014

(54) SEPARATION SYSTEM WITH SHOCK ATTENUATION

(75) Inventor: John A. Graham, Middletown, CT (US)

(73) Assignee: Ensign-Bickford Aerospace & Defense Company, Simsbury, CT (US)

( * ) Notice: Subject to any disclaimer, the term of this patent is extended or adjusted under 35 U.S.C. 154(b) by 0 days.

(21) Appl. No.: 13/482,059

(22) Filed: May 29, 2012

(65) Prior Publication Data
US 2013/0136525 A1    May 30, 2013

Related U.S. Application Data

(63) Continuation-in-part of application No. 12/501,577, filed on Jul. 13, 2009, now abandoned.

(60) Provisional application No. 61/082,689, filed on Jul. 22, 2008.

(51) Int. Cl.
*E01F 9/018* (2006.01)

(52) U.S. Cl.
USPC .............................................. 403/2; 102/378

(58) Field of Classification Search
USPC ................ 403/2, 364; 102/377, 378; 89/1, 14
See application file for complete search history.

(56) References Cited

U.S. PATENT DOCUMENTS

| | | |
|---|---|---|
| 3,304,031 A | 2/1967 | Mulquin |
| 3,420,470 A | 1/1969 | Meyer |
| 4,022,129 A | 5/1977 | Day et al. |
| 4,106,875 A | 8/1978 | Jewett |
| 4,685,376 A | 8/1987 | Noel et al. |
| 4,715,565 A | 12/1987 | Wittmann |
| 4,790,571 A | 12/1988 | Montanari et al. |
| 5,108,049 A | 4/1992 | Zinovi |
| 5,197,695 A | 3/1993 | Andersson et al. |
| 5,199,672 A | 4/1993 | King et al. |
| 5,271,582 A | 12/1993 | Perkins et al. |
| 5,318,255 A | 6/1994 | Facciano et al. |
| 5,361,676 A | 11/1994 | Gibbs |
| 5,372,071 A | 12/1994 | Richards et al. |
| 5,390,606 A | 2/1995 | Harris |

(Continued)

FOREIGN PATENT DOCUMENTS

| | | |
|---|---|---|
| CA | 2560370 A1 | 3/2008 |
| FR | 2888925 A1 | 1/2007 |

(Continued)

OTHER PUBLICATIONS

English Translation of FR 2 888 925 A1; Published Jan. 26, 2007.

(Continued)

*Primary Examiner* — Michael P Ferguson
*Assistant Examiner* — Daniel Wiley
(74) *Attorney, Agent, or Firm* — Cantor Colburn LLP

(57) ABSTRACT

A system for separating a first component and a second component is provided. The system includes a first joinder flange having at least one first fastener feature for coupling the first joinder flange to the first component. A second joinder flange is provided having at least one second fastener feature for coupling the second joinder flange to the second component. A separation portion is coupled between the first joinder flange and the second joinder flange, the frangible joint having at least one groove extending along width of the separation portion. An explosive member is arranged adjacent the separation portion. Wherein the first joinder flange includes at least one integral shock attenuation feature formed therein between the explosive member and the at least one first fastener feature.

16 Claims, 14 Drawing Sheets

(56) References Cited

U.S. PATENT DOCUMENTS

| | | |
|---|---|---|
| 5,743,492 A | 4/1998 | Chan et al. |
| 5,860,624 A | 1/1999 | Obry et al. |
| 5,898,123 A | 4/1999 | Fritz et al. |
| 5,969,287 A | 10/1999 | Blain et al. |
| 6,113,055 A | 9/2000 | Salman |
| 6,202,961 B1 | 3/2001 | Wilke et al. |
| 6,293,503 B1 | 9/2001 | Beal |
| 6,343,770 B2 | 2/2002 | Holemans |
| 6,357,698 B1 | 3/2002 | DiVerde et al. |
| 6,378,292 B1 | 4/2002 | Youngner |
| 6,488,268 B1 | 12/2002 | Albritton |
| 6,494,406 B1 | 12/2002 | Fukushima et al. |
| 6,708,928 B2 | 3/2004 | Telford |
| 7,114,683 B2 | 10/2006 | Hall |
| 2007/0084688 A1 | 4/2007 | Gilleo et al. |
| 2008/0078887 A1 | 4/2008 | Gaigler |
| 2012/0061520 A1 | 3/2012 | Graham |

FOREIGN PATENT DOCUMENTS

| | | |
|---|---|---|
| JP | 2001171600 | 6/2001 |
| JP | 2003063500 | 3/2003 |
| WO | 2008079841 A1 | 7/2008 |

OTHER PUBLICATIONS

EP Search Report for Application No. EP 09 16 6087; Mailed on Oct. 9, 2009.

Annex to EP Office Action for Application No. EP 09 166 087.8, filed Jul. 22, 2009, mailed Nov. 22, 2012.

EP Office Action for Application No. EP 09 166 087.8, filed Jul. 22, 2009, mailed Nov. 22, 2012. Communication from the Examining Division.

Japanese Office Action and English Language summary for Japanese Patent Application No. 2009-169842 filed Jul. 21, 2009. (3 pages) All references cited in OA are cited herein.

SEPARATION SYSTEM WITH SHOCK ATTENUATION

CROSS-REFERENCE TO RELATED APPLICATIONS

This application is a continuation in part of U.S. patent application Ser. No. 12/501,577 entitled "Low Shock Frangible Joint" filed Jul. 13, 2009, which claims the benefit of U.S. Provisional Application Ser. No. 61/082,689, entitled "Low Shock Frangible Joint", filed Jul. 22, 2008, both of which are incorporated herein by reference in their entirety.

BACKGROUND OF THE INVENTION

The present invention relates in general to a system that provides for the attenuation of shock, and in particular, to a separation device, such as a frangible joint for example, having shock attenuation features formed integrally therein.

Frangible joints of various design configurations are common, for example, those comprising a hollow form extrusion. Also, various devices for shock attenuation are also known, for example, those that include a cylindrical flexible structure having one or more viscoelastic members secured to an outer surface of the cylindrical structure. In this known arrangement, the cylindrical structure has machined features to manage the stiffness and shock transmissibility therethrough. The cylindrical structure may be used, for example, as a shock isolation mount between a spacecraft and a launch vehicle.

Frangible joints typically utilize an explosive charge to fracture the frangible joint at a predetermined location. It should be appreciated that while the frangible joints typically contain all or substantially all of the explosive event and the resulting debris, the separation event generates a considerable shock loading that is transmitted through the structural components to the remainder of the system. As payloads have been come smaller and lighter, in some cases they have also become more susceptible to damage from shock loading. The shock attenuation devices reduce the impact of the shock loading on the adjoining structures.

However, this arrangement suffers from the drawback that additional hardware components beyond the cylindrical structure (i.e., the viscoelastic members along with corresponding outer rigid constraining members secured to the outer surface of each viscoelastic member) are required to achieve the desired amount of shock attenuation between the components of the spacecraft.

Accordingly, while existing frangible joints and shock attenuation devices are suitable for their intended purposes the need for improvement remains, particularly in providing a separation system that includes shock attenuation features formed integrally therein, thereby reducing or eliminating the need for additional components to achieve the desired amount of shock attenuation.

SUMMARY OF THE INVENTION

According to an embodiment of the invention, a system for separating a first component and a second component is provided. The system includes a first joinder flange having at least one first fastener feature for coupling the first joinder flange to the first component. A second joinder flange is provided having at least one second fastener feature for coupling the second joinder flange to the second component. A separation portion is coupled between the first joinder flange and the second joinder flange, the frangible joint having at least one groove extending along width of the separation portion. An explosive member is arranged adjacent the separation portion. Wherein the first joinder flange includes at least one integral shock attenuation feature formed therein between the explosive member and the at least one first fastener feature.

According to another embodiment of the invention, a separation system for decoupling a first component from a second component is provided. The system includes a member having a first joiner flange and an opposing second joiner flange. A separation portion is disposed between the first joiner flange and the second joiner flange, the separation portion having a first wall and a second wall defining a cavity, the separation portion further having a first groove formed in the first wall and a second groove formed in the second wall, the first groove and the second groove being positioned opposite the cavity. An explosive member is disposed within the cavity. Wherein the first joiner flange includes a plurality of first integral shock attenuation features disposed between the groove and an end opposite the separation portion.

According to still another embodiment of the invention, another separation system for decoupling a first component from a second component. The system includes a first member having a joiner flange and a pair of coupling flanges, the first member having a plurality of first fastening features and at least one groove extending along a width of the first member, the first member further having a plurality of first integral shock attenuation features disposed between the plurality of first fastening features and the at least one groove. A second member is disposed between and coupled to the pair of coupling flanges. An explosive member is disposed between the pair of coupling flanges adjacent the at least one groove.

BRIEF DESCRIPTION OF THE DRAWINGS

The subject matter, which is regarded as the invention, is particularly pointed out and distinctly claimed in the claims at the conclusion of the specification. The various embodiments of the present invention can be understood with reference to the following drawings. The components are not necessarily to scale. Also, in the drawings, like reference numerals designate corresponding parts throughout the several views.

Figure 1:
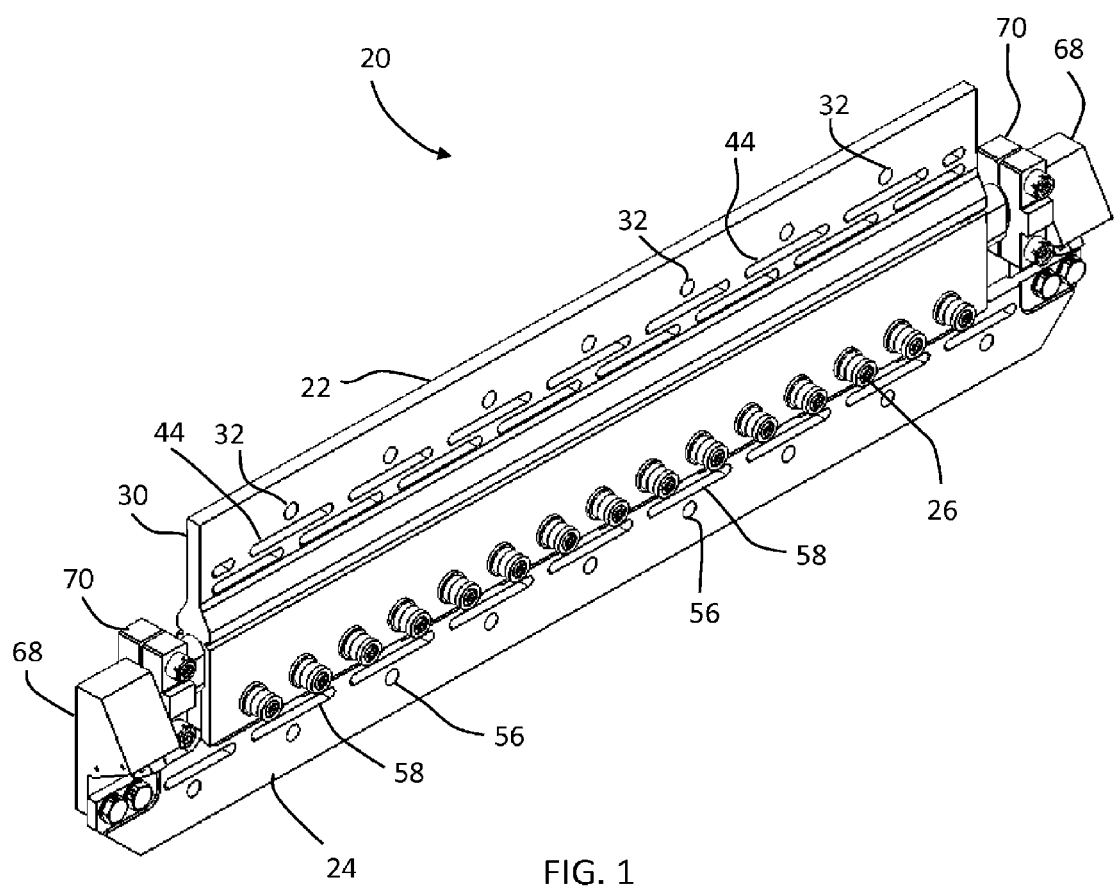
FIG. 1 is a perspective view of a separation system in accordance with an embodiment of the invention.

The detailed description explains embodiments of the invention, together with advantages and features, by way of example with reference to the drawings.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of" Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

In an embodiment of the invention, a separation system includes shock attenuation features formed as an integral part of the joint structure. Shock attenuation is achieved through use of, for example, slots or grooves that are machined directly, or otherwise formed integrally, into the separation system structure. Adequate shock attenuation is achieved solely by the features machined or otherwise formed in the separation system together with the typical assembly of the separation system into various structures (e.g., as a payload separator for rockets, missiles, satellites, etc.), without the need for additional hardware components and thus without the need for assembly of a separate shock attenuation device.

The foregoing and other features of various disclosed embodiments of the invention will be more readily apparent from the following detailed description and drawings of the illustrative embodiments of the invention wherein like reference numbers refer to similar elements.

A separation system 20 is shown in FIGS. 1-5 having a plurality of shock attenuation features formed integrally therein in accordance with an embodiment of the invention. It should be appreciated that while the separation system 20 is illustrated as a relatively short length component, the separation device 20 may be straight, or curved. In embodiments where the separation system 20 is curved, the separation device may be a portion of an arc, or may extend an arc length that is greater than 350 degrees. For embodiments used in large diameter rockets, separation device 10 may comprise a series of circular segments with each segment connected to the adjacent segments by a detonation manifold.

Figure 4:
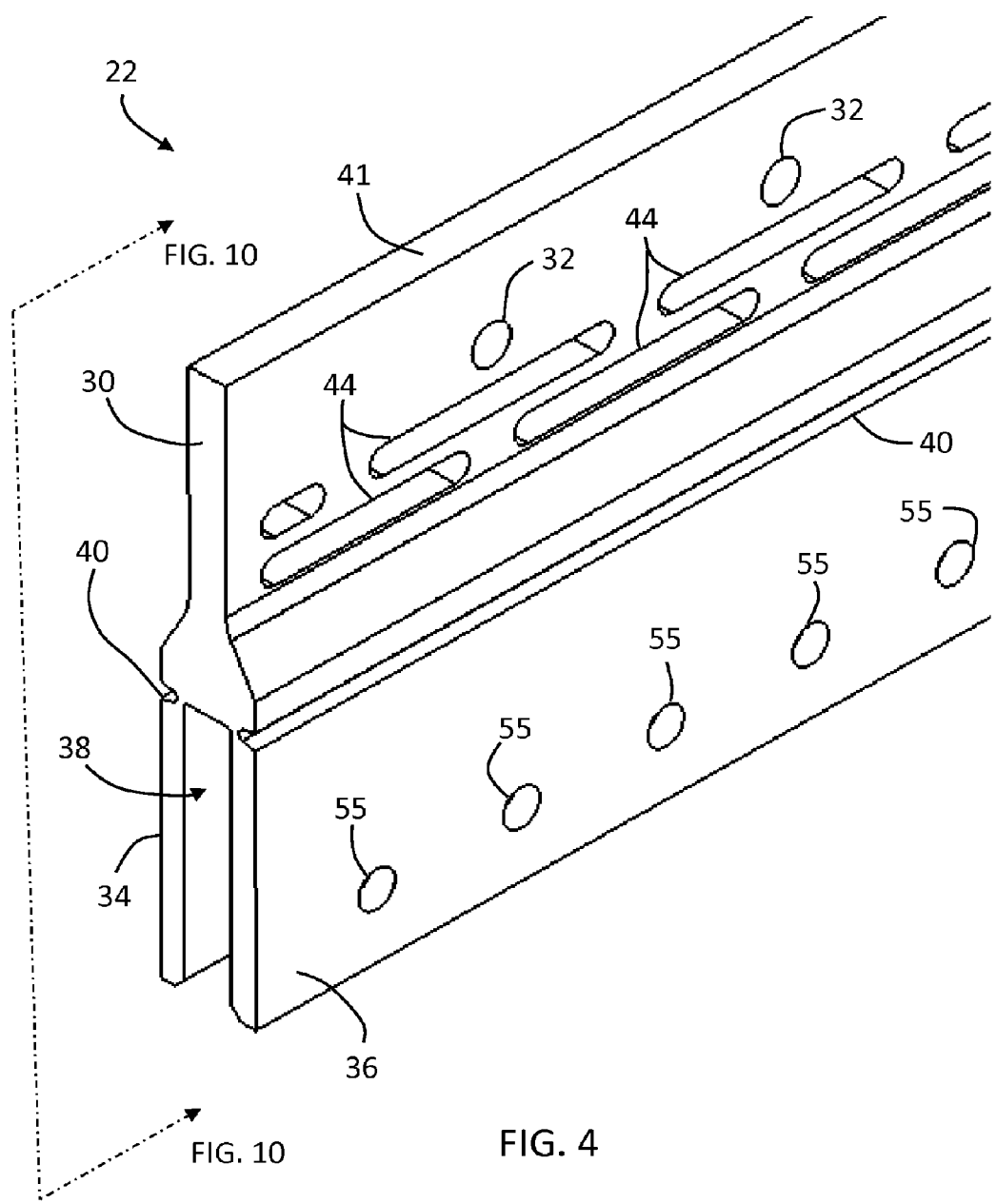
FIG. 4 is a perspective view of a first member of the separation system of FIG. 1.
Figure 5:
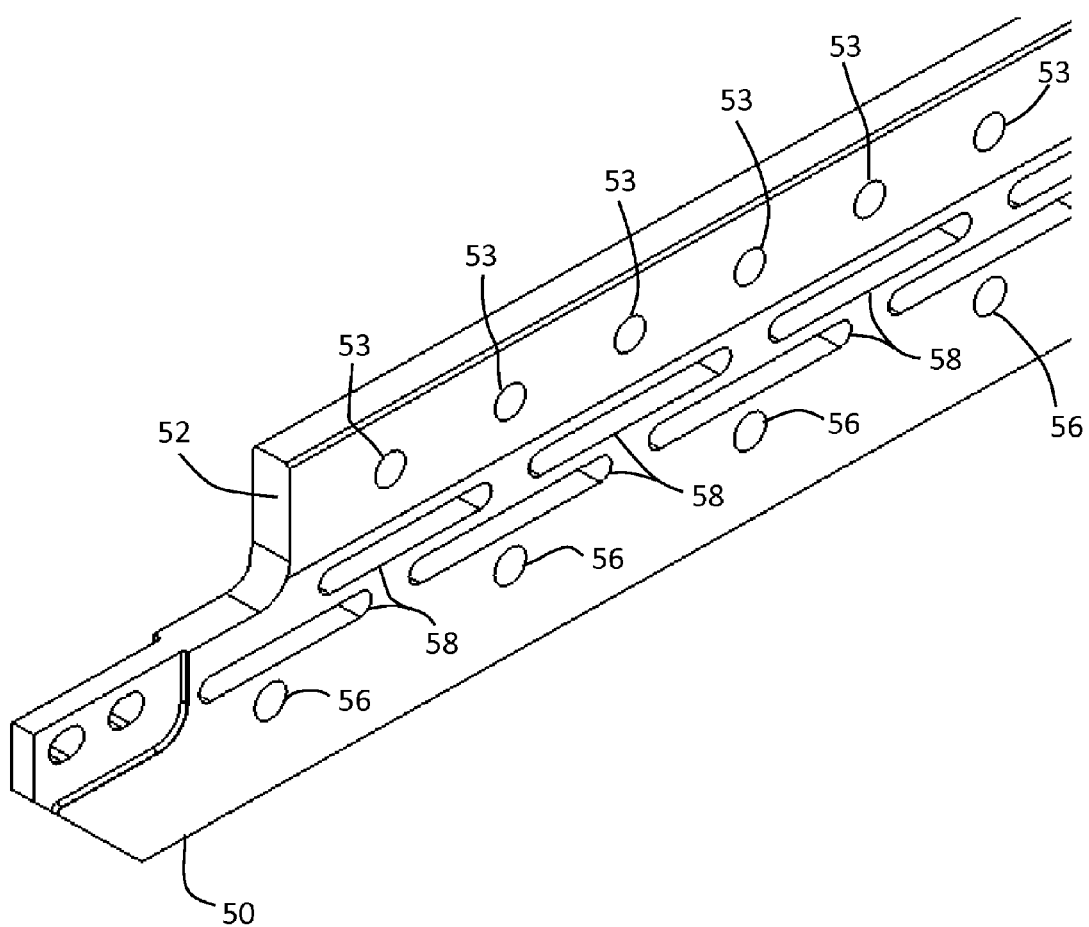
FIG. 5 is a perspective view of a second member of the separation system of FIG. 1.
Figure 11:
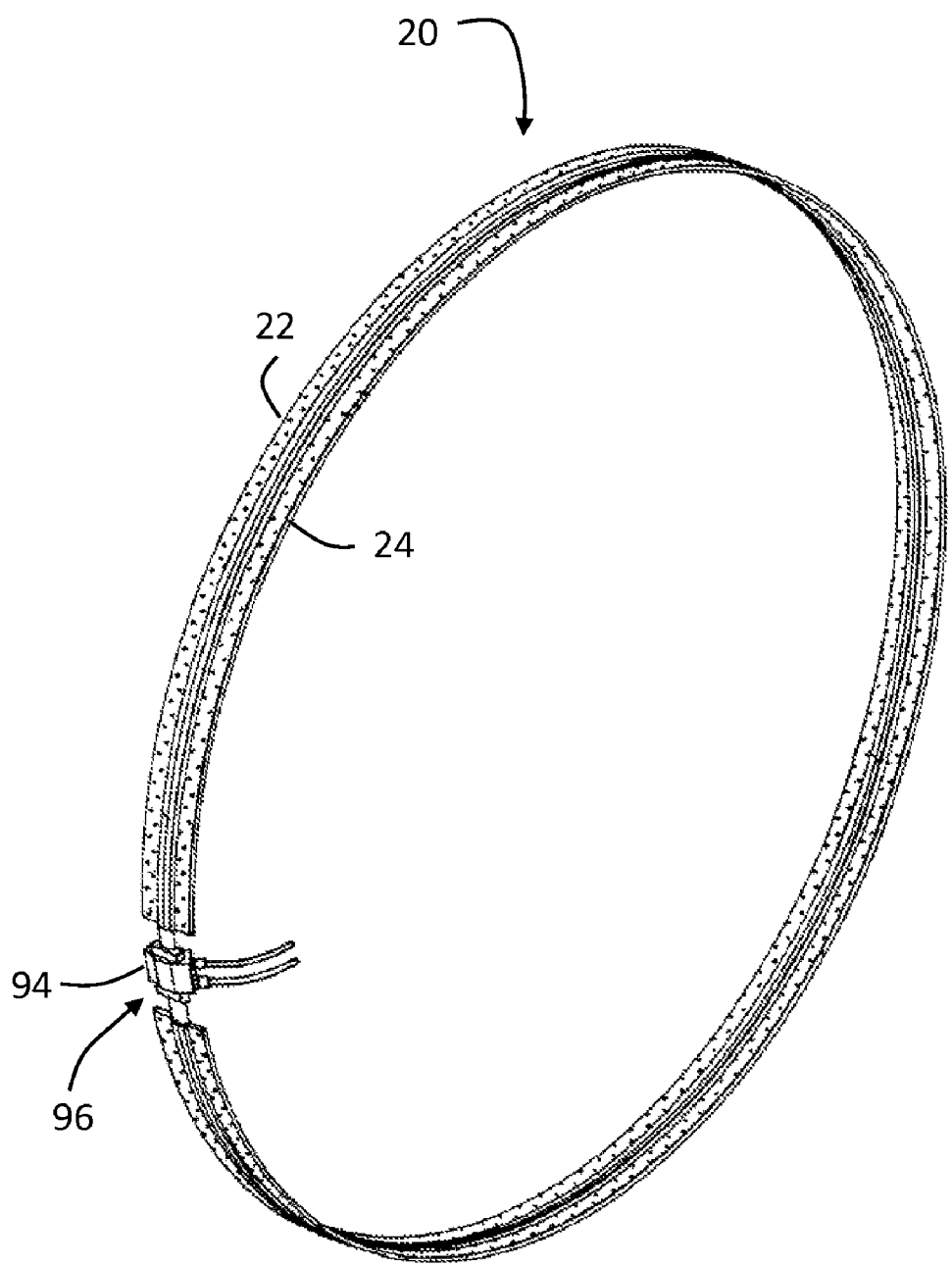
FIG. 11 is another perspective view of the separation system of FIG. 8.

The separation system 20 includes a first member 22 coupled to a second member 24 by a plurality of fasteners, such as bolts 26 for example. It should be appreciated that while the fasteners described herein refer to bolts, the claimed invention should not be so limited and other fasteners, such as but not limited to rivets, screws, crimped joints, magnets, welded joints, and adhesively bonded joints may be used. The first member 22 and the second member 24 are each coupled to components or structures such as a fairing 28 (FIG. 11). It should be appreciated that the separation system 20 allows the components to be separated during use. The first member 22 includes a first joinder flange 30 having a plurality of fastening features, such as bolt holes 32 for example. The bolt holes 32 allow the first joinder flange 30 to be coupled to the corresponding component, such as fairing 28A for example. Extending from one end of the first joinder flange 30 is a first coupling flange 34 and a second coupling flange 36. The first coupling flange 34 and the second coupling flange 36 are spaced apart to define a clevis having a gap 38 (FIG. 4). As will be discussed in more detail herein the gap 38 is sized to receive a portion of the second member 24 and a detonation charge.

Figure 6:
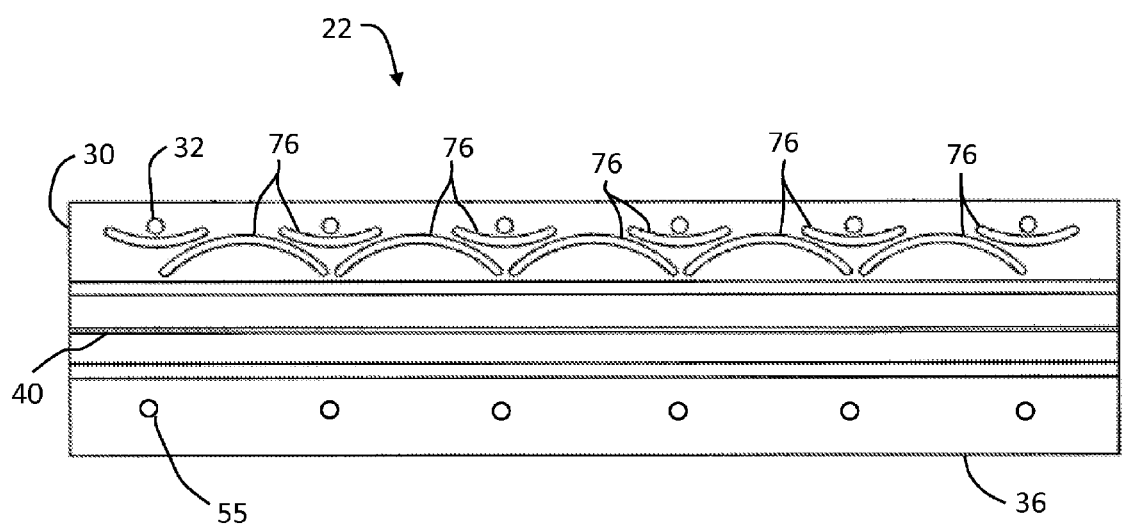
FIG. 6 is a side view of a first member of the separation system of FIG. 1 in accordance with another embodiment of the invention.
Figure 7:
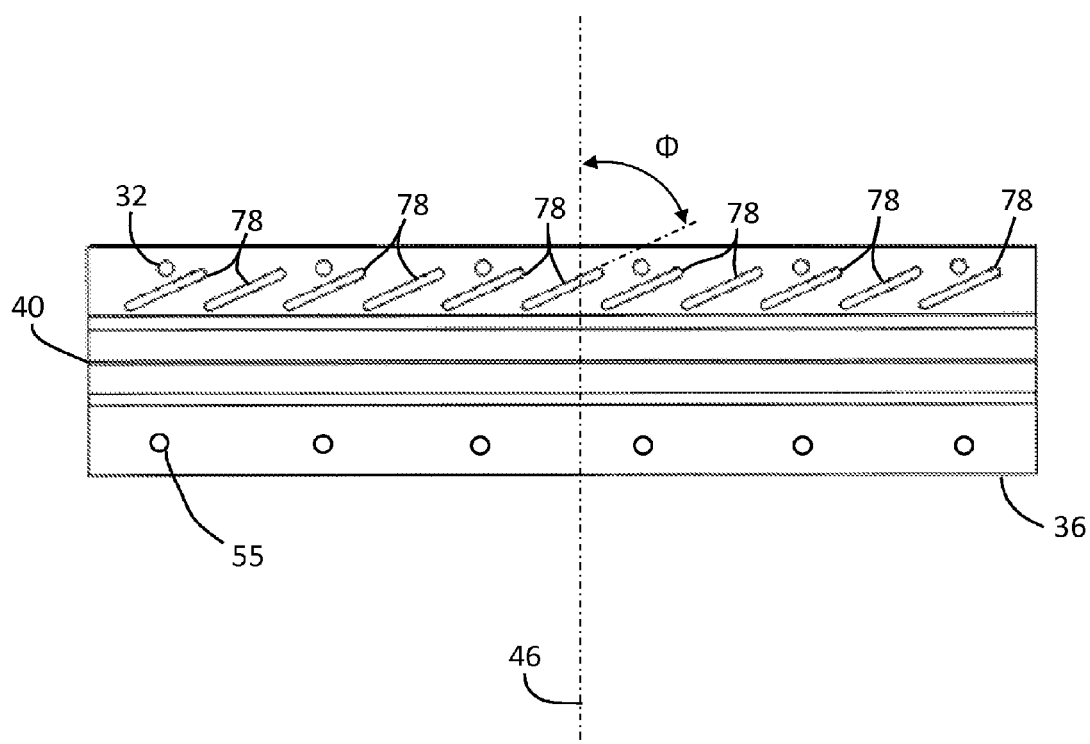
FIG. 7 is a side view of a first member of the separation system of FIG. 1 in accordance with another embodiment of the invention.
Figure 10:
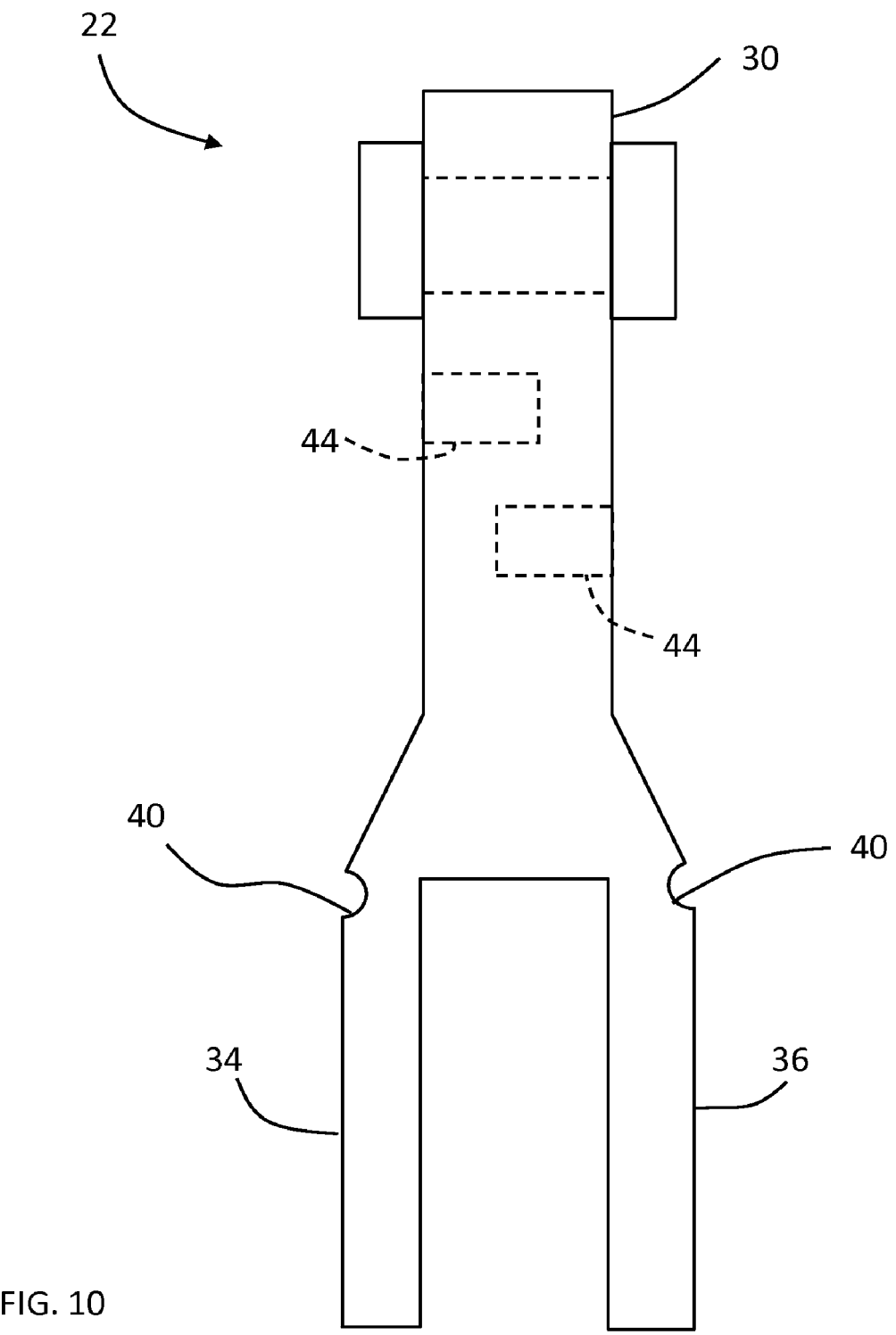
FIG. 10 is a side view of the first member of the separation system of FIG. 4 in accordance with another embodiment of the invention.

In the exemplary embodiment, the coupling flanges 34, 36 each have a channel or groove 40 formed along the length of the outer surface. The grooves 40 are positioned to narrow the amount of material between the outer surface and the gap 38 to form a separation portion 42. As will be discussed in more detail herein, the separation portion 42 forms a separation plane that fractures when the detonation charge is operated to separate the first member 22 from the second member 24. Arranged between the groove 40 and the bolt holes 32 are a plurality of attenuation features 44. In the exemplary embodiment, attenuation features 44 are straight slots. In other embodiments, the slots 44 may be curved (FIG. 6) or be arranged on an angle relative to a longitudinal axis 46 of the components to which the separation system is attached (FIG. 7). The attenuation features 44 may extend through the thickness of the joiner flange, or may extend partially through the joiner flange as shown in FIG. 10. In one embodiment, the slots 44 are arranged in two or more parallel rows where the adjoining slots 44 are offset or staggered by a distance 48 such that there is no direct route through the member 22 from the gap 38 to an end 41. In one embodiment, the bolt holes 32 are laterally arranged between the ends of the slots 44. Where the attenuation features do not extend through the thickness, the adjoining rows may be formed on opposites sides of the joiner flange to avoid having a direct path of travel for the shock wave. This may provide advantages in maintaining a seal between the external environment and the internal areas where the payload is carried.

The second member 24 includes a second joinder flange 50. In the exemplary embodiment, the second joinder flange 50 includes a first portion 52 that is disposed in the gap 38. The first portion 52 includes a plurality of holes 53 (FIG. 5) that are sized and positioned to cooperate with corresponding holes 55 (FIG. 4) in the coupling flanges 34, 36 to receive fasteners, such as the bolts 26. The second joinder flange 50 further includes a second portion 54 having a plurality of fastener features, such as bolt holes 56 for example, that allow the second joinder flange to be coupled to one of the components, such as fairing 28B for example. As discussed above with respect to the plurality of fastener features in the first member 22, the plurality of fastener features in the second member 24 may be, but not limited to rivets, screws, crimped joints, magnets, welded joints, and adhesively bonded joints. Similar to the first joinder flange 30, the second portion 54 includes a plurality of attenuation features 58 arranged between the bolt holes 56 and the first portion 52. In the exemplary embodiment, the attenuation features 58 are slots. The slots 58 may be straight, curved or a combination of thereof. The slots 58 may further be arranged in two or more parallel rows.

The separation system 20 further includes a detonation assembly 60. The detonation assembly 60 includes a containment tube 62 of an oblong cross-sectional configuration and within which an elastomeric charge holder 64 supports a detonation charge, such as a mild detonating cord 66. In one embodiment, the mild detonating cord 66 is made from hexanitostilbene (HNS) inside an aluminum sheath that is drawn down to 23.25 grains per foot. The oblong cross sectional configuration of the containment tube 62 provides it with a major axis and a minor axis. The charge holder 64 and the detonating cord 66 extend along the entire length of the separation portion 42.

Coupled to each end of the separation system 20 is a manifold 68 which is coupled by a clamp 70 to a sleeve 72. The manifold 68 includes a port for receiving an initiation device such as a flexible confined detonating cord (FCDC) having a cup on the end loaded with an HNS-IA charge, a hot bridge detonator or a laser initiated detonator. The initiation device is arranged to ignite the detonating cord 66. To effect separation of the separation system 20, the initiation device is detonated causing the cord 66 to detonate. The detonation of the cord 66 causes an explosive force which results in the containment tube 62 expanding along its minor axis at the separation portion 42 adjacent both grooves 40. This results in the outward deformation of the coupling flanges 34, 36. As the flanges 34, 36 deform, the separation portion 42 fractures under shear loading between the groove 40 and the gap 38 resulting in the separation of the first joinder flange 30 from the second joinder flange 50. Once the fracture is complete, the components to which the flanges 30, 50 are coupled are free to separate.

The manifold 68, clamp 70, sleeve 72 and detonation assembly 60 are configured to prevent the release of shrapnel and other chemical by-products of the detonation of the detonating cord 66. This protects the components from damage and exposure to other potential contaminants that may disrupt the operation of the components and their sub-systems. It should be appreciated however, that even though the shrapnel, debris and chemical contaminants are contained, the detonation of cord 66 results in a large release of energy that causes a shock wave to travel through the separation system 20 into the components to which they are respectively joined. It is desirable to attenuate the shock wave to reduce the impact of the separation event on the attached components. Attenuating the shock wave provides advantages in increasing the reliability and life expectancy of the attached components and their sub-systems. Further cost advantages may be gained by reducing the requirements for isolation members in the attached components due to an attenuation of the shock wave.

Figure 2A:
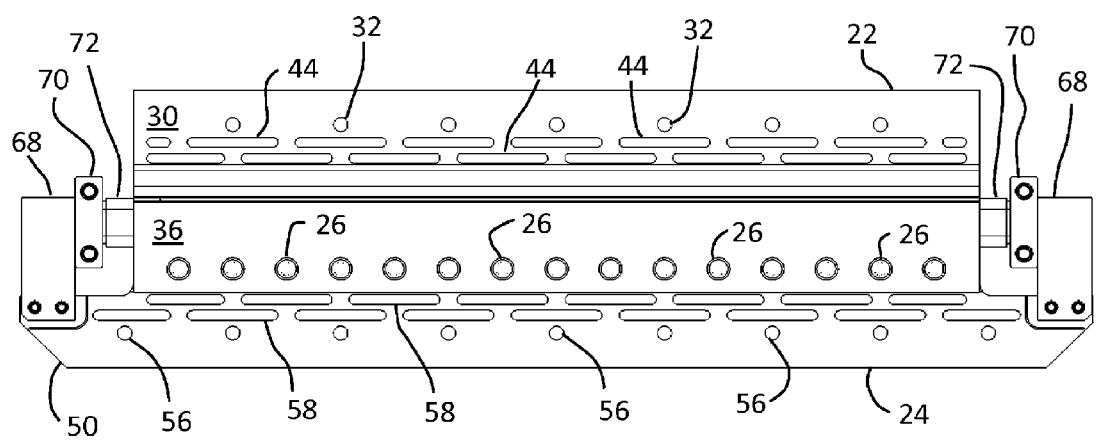
FIG. 2A is a side view of the separation system of FIG. 1.
Figure 2B:
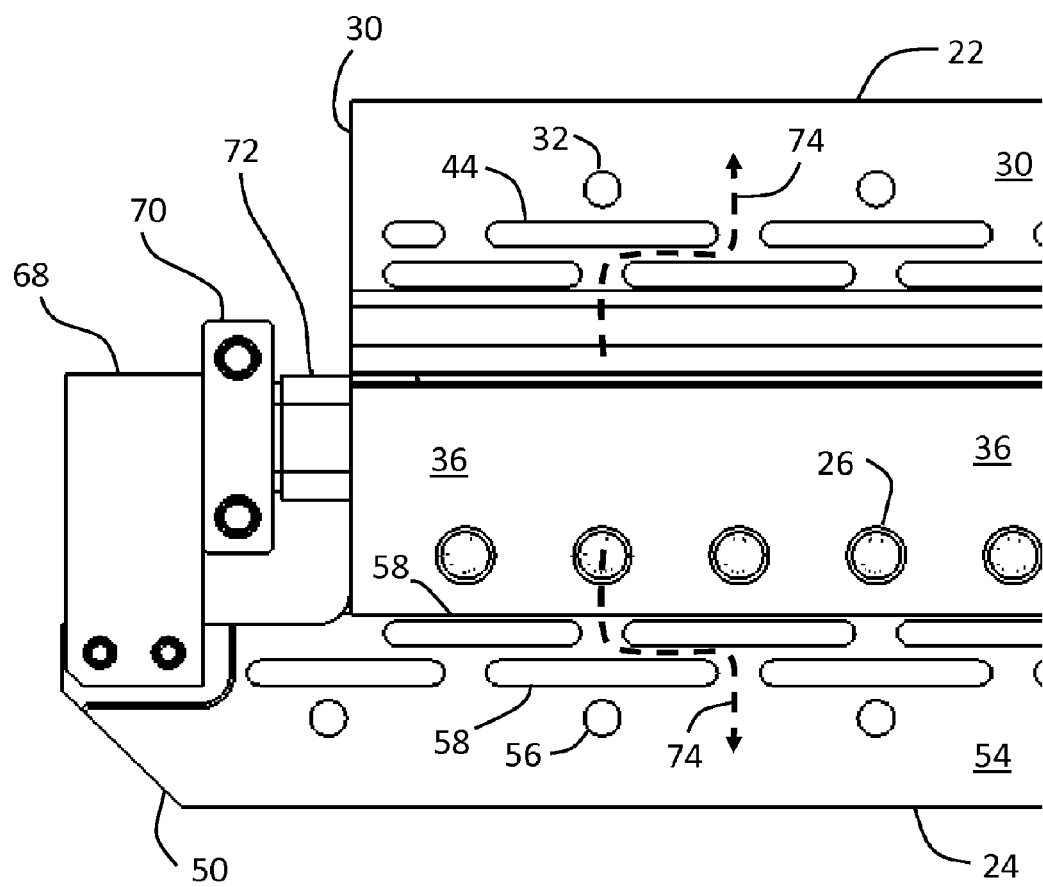
FIG. 2B is an enlarged portion of the separation system of FIG. 2A.
Figure 3:
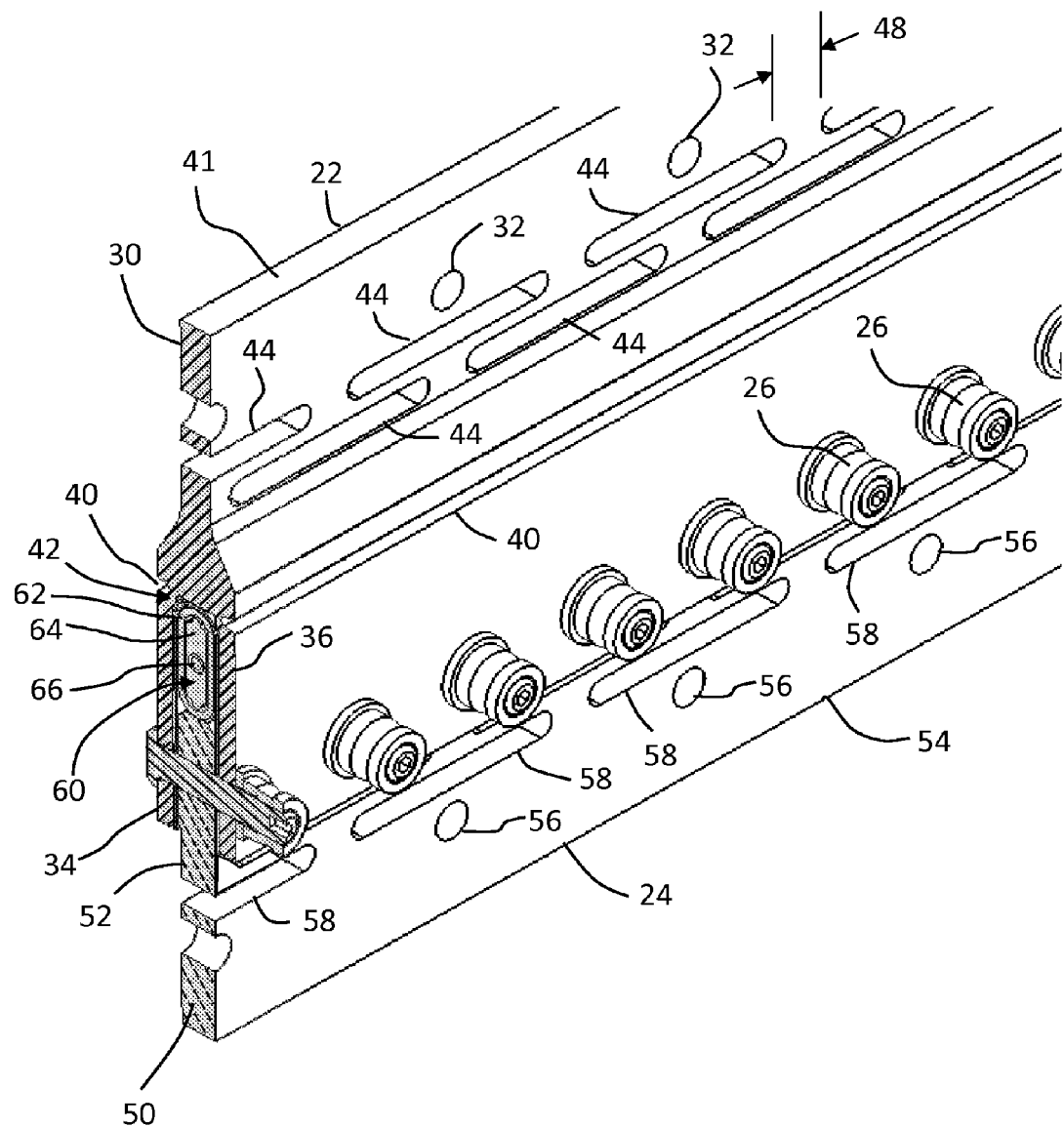
FIG. 3 is a perspective view, partially in section of the separation system of FIG. 1.

In accordance with embodiments of the invention, the separation system 20 includes attenuation features 44, 58 arranged on at least one side of the detonation assembly 60. In some embodiments, the attenuation features are arranged on one side of the detonation assembly, typically the side closer to the payload or other componentry that it is desirable to protect from the shock wave generated during the separation event. However in other embodiments, two sets of attenuation features are provided on both sides of the detonation assembly. It should be appreciated that while embodiments of the invention illustrate the attenuation features 44, 58 as a pair of parallel and offset features, the claimed invention should not be so limited and other configurations that provide the desired level of structural stiffness may be used. In the exemplary embodiment, the attenuation features 44, 58 each include a two rows of slots where the slots in a first row are offset from the slots in a second row to provide a circuitous or labyrinth path 74 for the shock wave to travel as it extends from the point of detonation (FIG. 2B). In the exemplary embodiment, the slots 44 are arranged such that each of the bolt hole 32, 56 is centered laterally on the adjacent slot 44, 58 such that the path 74 of the shock wave does not travel directly from the point of detonation to the fasteners that couple the members 22, 24 to the attached components.

As the shock wave travels from the point of detonation, the slots 44, 58 allow the joinder flanges 30, 50 to flex and deform to further dissipate energy. The attenuation features further reduce the shock loading by reflecting the shock wave back towards the separation portion. Since the separation portion is fractured, this wave will reflect back and forth until dissipated. In some embodiments, the attenuation features may clip certain natural frequency responses. Thus, the attenuation features 44, 58 reduce the amount of shock transferred to the attached components.

As discussed herein, the geometry of the slots 44, 58 may be straight, angled, curved or a combination thereof. The different geometric configurations provide a separation system 20 with different levels or degrees on the structural stiffness, which in turn effect the amount of shock attenuation achieved. The different geometric configurations further affect the joint load capacity (longitudinal, shear and bending). Referring to FIG. 6, there is illustrated a first member 22 having shock attenuation features formed integrally therein in accordance with another embodiment of the invention. In this embodiment, the shock attenuation features comprise a plurality of grooves or slots 76 that are curved, wherein some of the grooves or slots 76 have a convex shape and other grooves or slots 76 have a concave shape. FIG. 7 illustrates a first member 22 having shock attenuation features formed integrally therein in accordance with yet another embodiment of the invention. In this embodiment, the shock attenuation features comprise a plurality of slots or grooves 78 that are arranged on an angle Φ relative to the width of the separation system 20 or the longitudinal axis 46.

It should be appreciated that while the embodiments shown in FIG. 6 and FIG. 7 illustrate the attenuation features formed in the first member 22, the second member 24 may similarly have attenuation features that are identical to or a mirror image of the slots 76, 78 in first member 22. In still further embodiments, the first member 22 and the second member 24 may slots with different geometries. For example, the first member 22 may have curved slots and the second member 24 may have straight slots. In other embodiments, the slots may not be symmetrically shaped about the center of the slot to impart a torsional loading on the attached component. These non-symmetric shapes may provide advantages in facilitating separation of the components.

Figure 8:
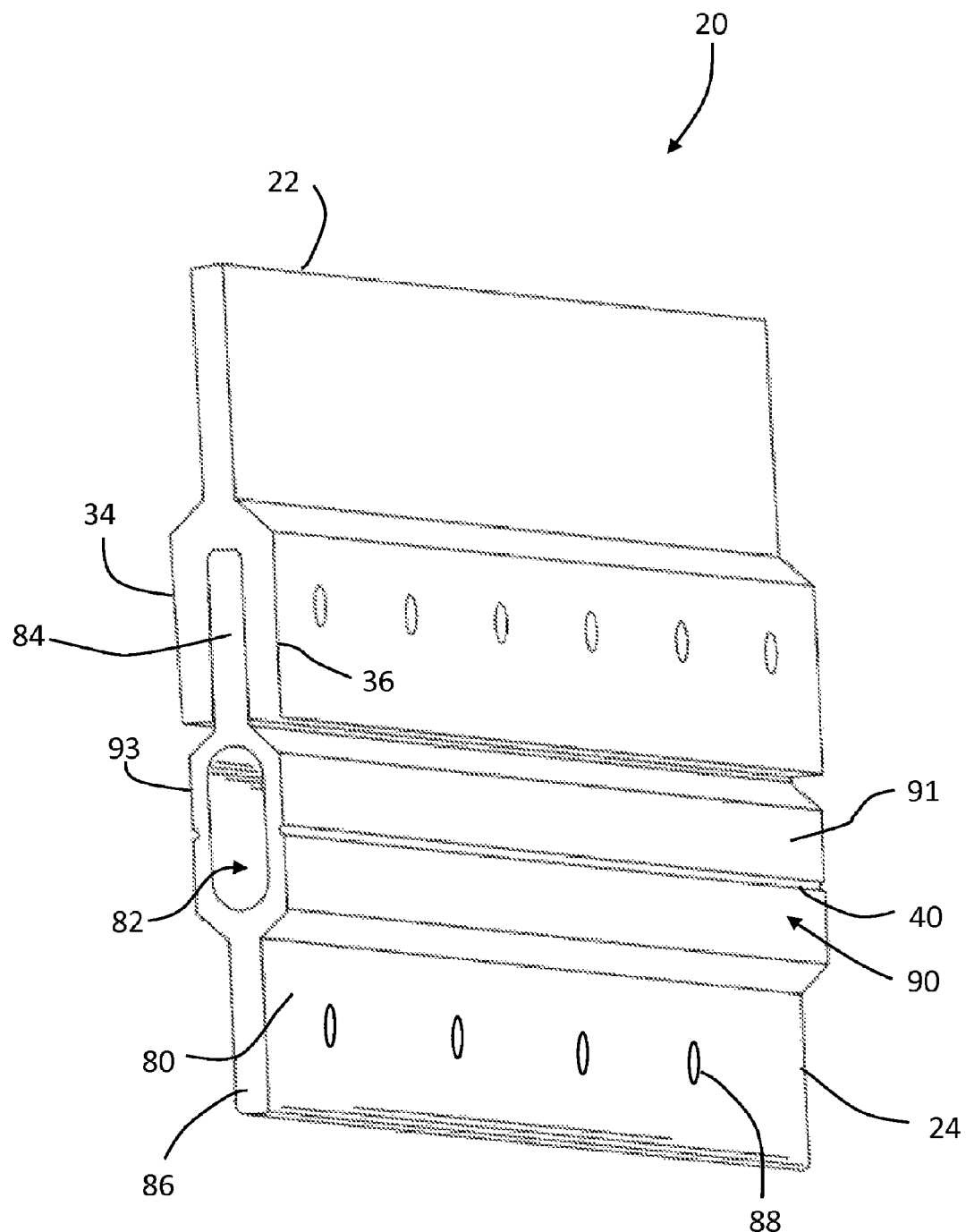
FIG. 8 is a perspective view of a separation system in accordance with another embodiment of the invention.
Figure 9:
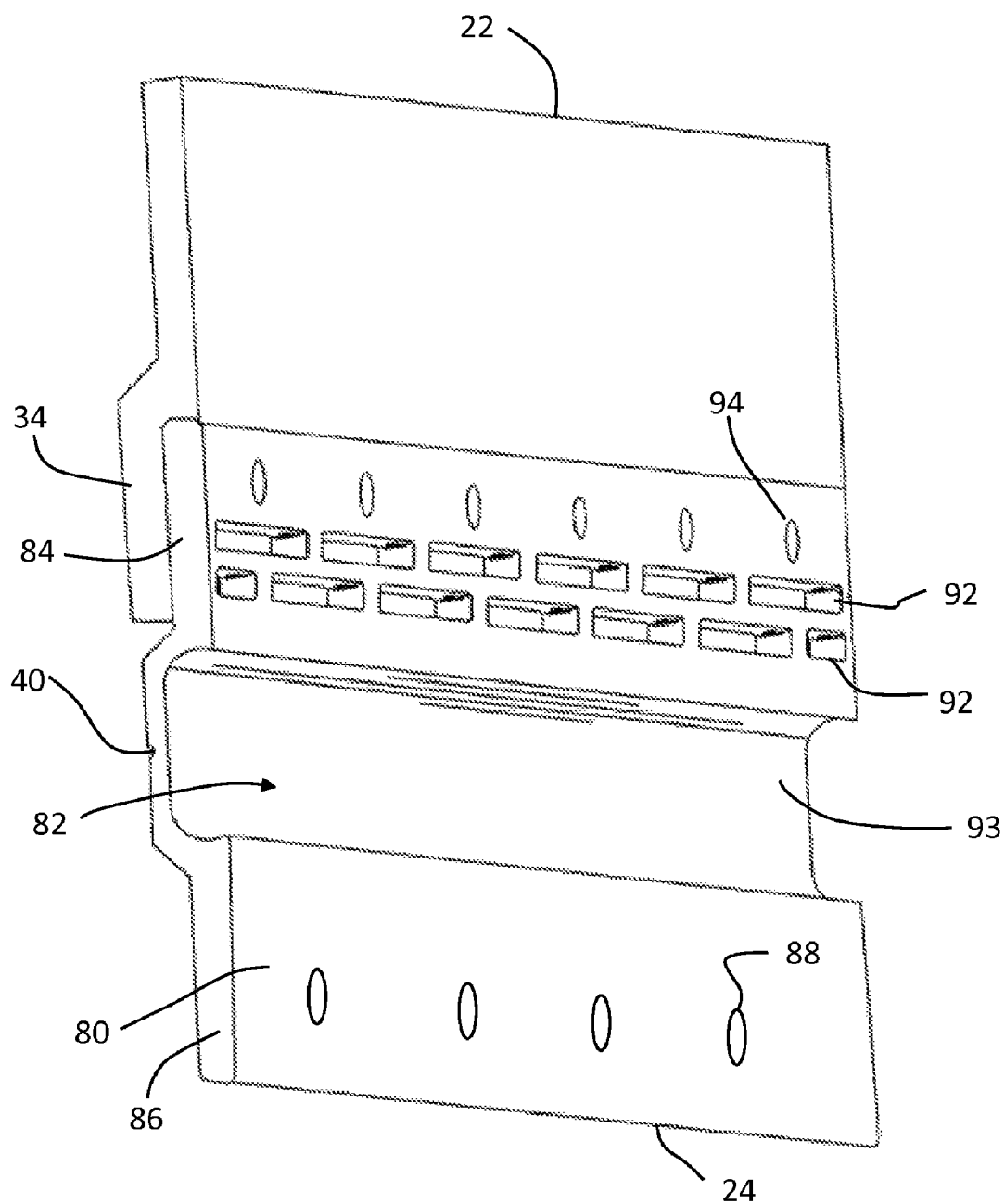
FIG. 9 is a partial perspective view of the separation system of FIG. 8.

The design of the slots or grooves that comprise the shock attenuation features of the invention can be applied to any of frangible joint type separation systems (e.g., hollow form extrusion, tongue-in-groove, thrust, etc.). For example, FIG. 8 shows a hollow form extrusion type separation system 20. In this embodiment, the first member 22 and the second member 24 are formed from a single extruded member 80 having an integral cavity 82. In this embodiment, the cavity 82 is sized and shaped to receive the detonation assembly 60 therein. The member 80 includes a first flange 84 that extends into the gap 38 formed by the coupling flanges 34, 36 and an opposing second flange 86 that couples with the adjacent component via fastener elements 88 (e.g. bolts).

Between the flanges 84, 86 is a frangible separation portion 90 having a first wall 91 and a second wall 93 that define the cavity 82. In this embodiment, the groove 40 is centrally located on the separation portion 90. The first flange 84 includes attenuation elements, such as slots 92 for example, that are arranged between the cavity 82 and the fastener elements, e.g. bolt holes 94 that couple the first member 22 to the desired component. As discussed herein with reference to the embodiment of FIGS. 1-5, the slots 92 are arranged to create a shock wave path that avoids having the shock loading applied directly to the fasteners that couple the first member 22 to the desired components (e.g. fairing 28A). Further, in other embodiments, the separation system 20 may include additional attenuation elements in the second flange 86 between the cavity 82 and the fastener elements 88.

The shock attenuation features may be machined directly into the separation system or formed in some other manner, depending in part upon the material that comprises the members 22, 24. An advantage of the separation system of the various embodiments of the invention is that no additional components are used, thus additional undesirable assembly steps may be avoided.

In one embodiment, the separation system 20 shown in FIG. 11 forms a ring that extends in a circle greater than 350 degrees. The manifold 94 is arranged in the gap 96 between the ends of the members 22, 24. It should be appreciated that this embodiment may provide advantages in facilitating assembly of the separation system 20 to the components since multiple individual sections do not have to be separately assembled.

Figure 12:
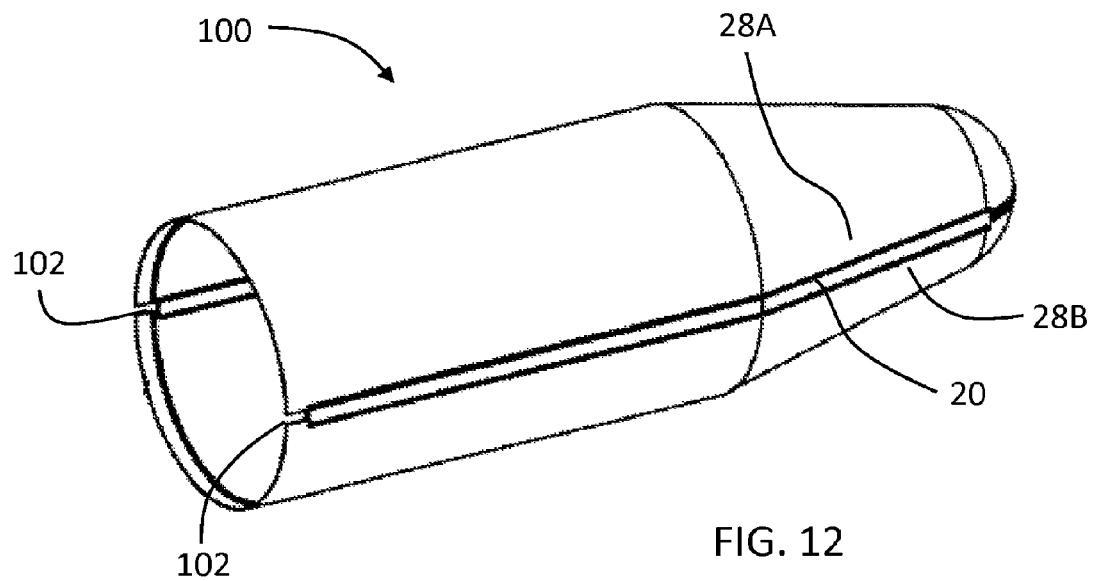
FIGS. 12-14 are perspective views of a rocket having seams between the fairing halves that include a separation system with shock attenuation.
Figure 13:
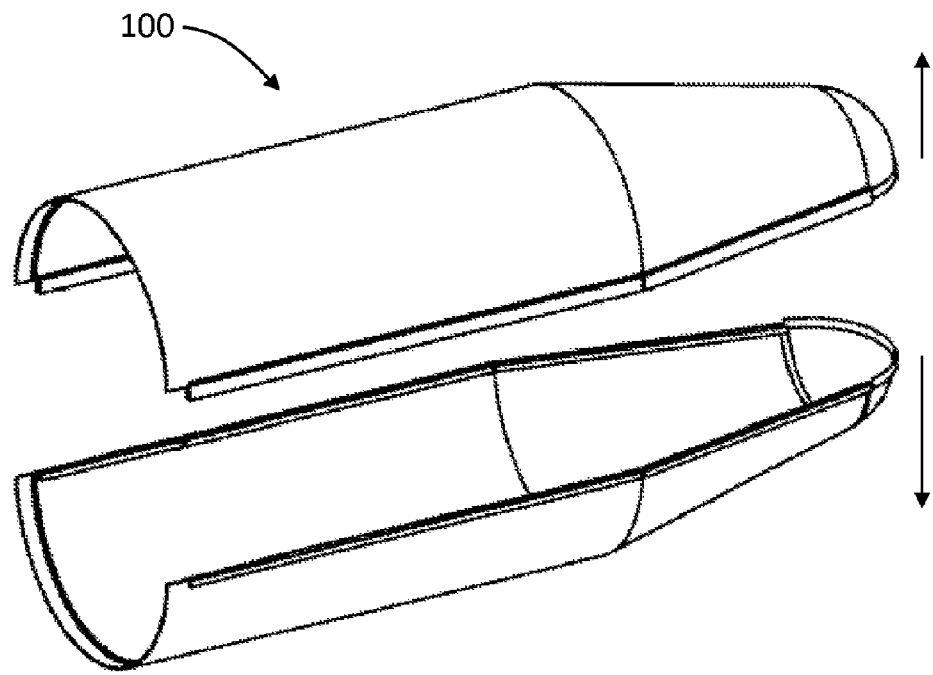
Figure 14:
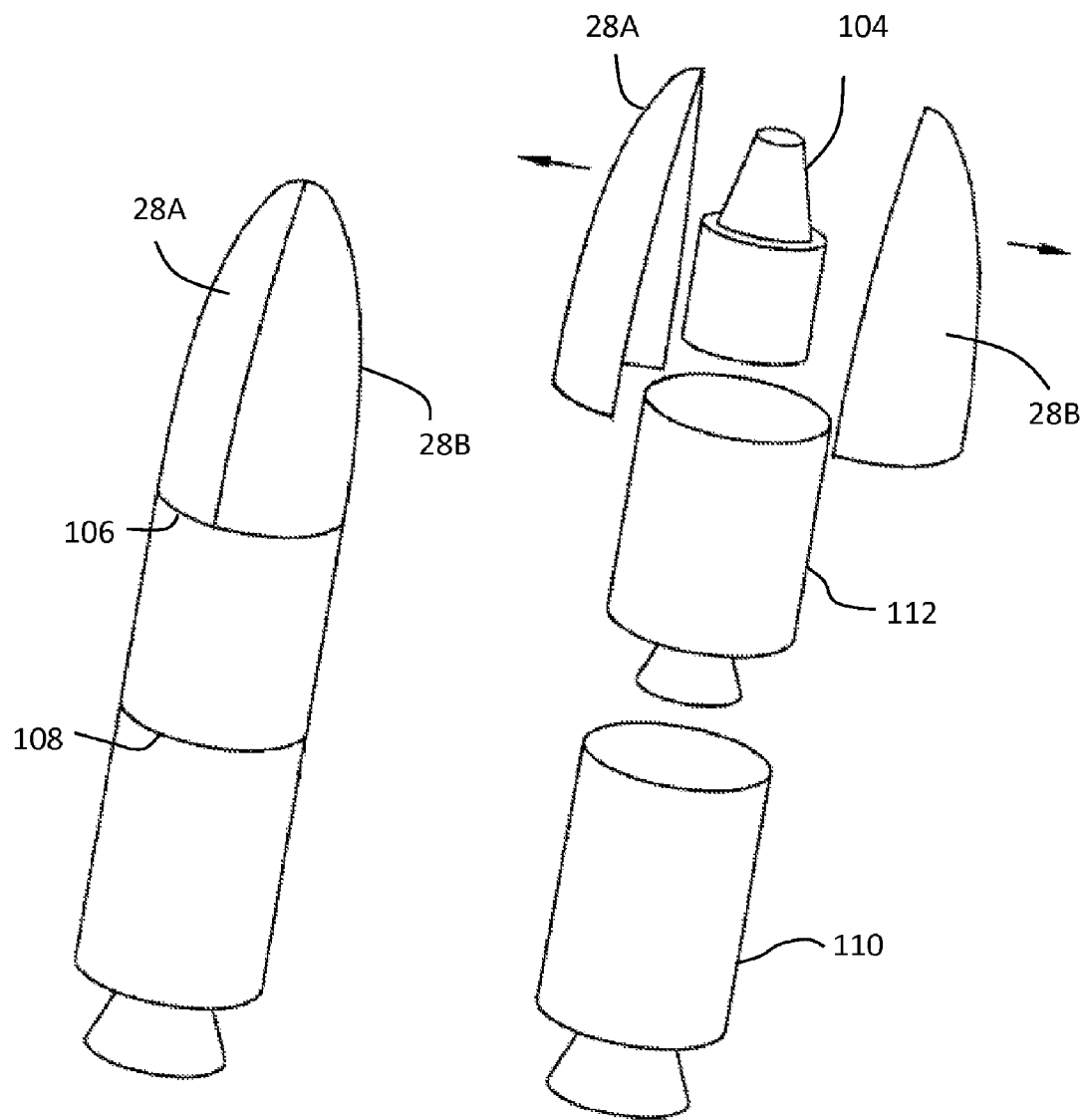

Separation systems 20 have been used in many applications, such as in aerospace applications to quickly, efficiently and reliably separate components. In one embodiment, shown in FIGS. 12-14, the separation system 20 is coupled to a space launch vehicle 100. In this embodiment, the separation system 20 is coupled fairings 28A, 28B along the longitudinal fairing split line joints 102 to allow the jettison (FIG. 12) of the fairings 28A, 28B to deploy a payload 104 (FIG. 13). The separation system 20 may further be used in circumferential base joints 106 and interstage joints 108 that allow a lower stage rocket 110, for example, to be separated from an upper stage rocket 112.

It should be appreciated that while embodiments herein describe the separation system 20 in reference to a tongue and groove or hollow form extrusion type separation system, the claimed invention should not be so limited. The separation system may also be a thrusting type joint, such as that described in U.S. Pat. No. 5,390,606 for example. In other embodiments, the separation system 20 may be an expanding tube joint (X-Tube), a double fracture joint, an expanding-tube rivet shear joint, a flexible linear shaped charge joint, or a pyrotechnic super-zip system for example.

It should be further appreciated that while embodiments herein describe the separation system 20 as being coupled to the adjoining components by fasteners, in some embodiments the joiner flanges are integral with the component or fairing rather than a separately attached member.

It should be further appreciated that while embodiments describe the coupling of the separation system 20 in reference to fairings, this is for exemplary purposes and the claimed invention should not be so limited. In other embodiments, the separation system 20 is coupled between the payload, such as a satellite for example, and the structure of the spacecraft or the fairing for example. In other embodiments, the separation system 20 is coupled between two different payloads arranged within the spacecraft. In other embodiments, the separation system 20 may be used between two stages of a rocket. In still other embodiments, the separation system 20 may be used to decouple service panels from the spacecraft.

Embodiments of the present invention provide advantages in incorporating shock attenuation features into a separation system that allows the separation of coupled components while reducing the impact of the separation process or detonation from the coupled components. Embodiments of the present invention provide advantages in reducing the weight of the separation system since the attenuation features are integrally formed in the separation system. Further embodiments of the present invention provide advantages in that the structural stiffness of the separation system may be managed to provide the desired characteristics for an application.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A system for separating a first component and a second component comprising:
   a first longitudinally extending joinder flange having opposing first and second portions:
   the first portion comprising a pair of opposing coupling flanges, at least one of the coupling flanges comprising a separation portion thereon, the separation portion including at least one longitudinally extending groove on a surface of the at least one coupling flange, and
   the second portion comprising at least one first fastener aperture for coupling the first joinder flange to the first component and at least one elongate shock attenuating aperture disposed laterally between the at least one first fastener aperture and the at least one groove;
   a second longitudinally extending joinder flange having opposing third and fourth portions;
   the third portion of the second joinder flange being fixedly coupled to and between the opposing coupling flanges of the first joinder flange; and
   the fourth portion of the second joinder flange having at least one second fastener aperture for coupling the second joinder flange to the second component; and
   an explosive member arranged between the third portion and between the opposing coupling flanges of the first joinder flange, adjacent the separation portion; and,
   wherein the at least one shock attenuating aperture lies in a shock wave path between the explosive member and the at least one first fastener aperture, such that a shock wave created by activating the explosive member does not travel directly to the at least one first fastener aperture.

2. The system of claim 1, wherein the at least one shock attenuation aperture is formed partially through a thickness of the first joinder flange.

3. The system of claim 2 wherein the at least one shock attenuation aperture is one of a straight slot or a curved slot.

4. The system of claim 3 wherein the at least one shock attenuation slot is curved.

5. The system of claim 3 wherein: the at least one shock attenuation aperture is disposed on an angle relative to the longitudinal direction of the first and second joinder flanges.

6. The system of claim 1 wherein:
   the at least one first fastener aperture includes a third fastener aperture and a fourth fastener aperture; and,
   the at least one shock attenuation aperture defines a shock wave path that extends between the third fastener aperture and the fourth fastener aperture,
   wherein the shock wave path is disposed on a portion of the system that the shock wave is transmitted through in response to activation of the explosive member.

7. A separation system for decoupling a first component from a second component, the system comprising:

a member having a first longitudinally extending joiner flange and an opposing second longitudinally extending joiner flange, each joiner flange having opposing first and second portions;

a separation portion disposed between the first joiner flange and the second joiner flange, the separation portion defined by opposing first and second walls extending from the second portion of the first joiner flange toward the first portion of the second joiner flange, the first and second walls defining a cavity therebetween, wherein the first portion of the second joiner flange is fixedly coupled within the cavity, the separation portion further having a first groove formed in the first wall and a second groove formed in the second wall, the first groove and the second groove being positioned opposite the cavity; and an explosive member disposed within the cavity;

wherein the first joiner flange includes a plurality of elongate first shock attenuation apertures integrally formed on the first portion of the first joiner flange adjacent the grooves; and wherein the first joiner flange further includes a plurality of first fastening apertures for coupling to the first component, the first fastening apertures positioned on the upper portion thereof such that the plurality of first shock attenuation apertures are laterally disposed between the grooves and the plurality of first fastening apertures;

wherein each of the plurality of shock attenuating apertures lies in a shock wave path between the explosive member and a respective one of the plurality of first fastening apertures, such that a shock wave created by activating the explosive member does not travel directly to the plurality of first fastening apertures.

8. The system of claim 7 wherein: the plurality of first shock attenuation apertures include a plurality of first features, each of the plurality of first features being spaced apart by a predetermined distance.

9. The system of claim 8 wherein the plurality of first features define a plurality of shock wave paths extending between the plurality of first features, the plurality of first features being disposed between adjoining shock wave paths, wherein each of the plurality of shock wave paths is disposed on a portion of the system that the shock wave is transmitted through in response to activation of the explosive member.

10. The system of claim 9 wherein the shock attenuating apertures are straight slots.

11. The system of claim 10 wherein the straight slots are on an angle relative to the longitudinal direction of the first joiner flange and the second joiner flange.

12. The system of claim 9 wherein the shock attenuating apertures are curved slots.

13. A separation system for decoupling a first component from a second component, the system comprising:
    a first longitudinally extending member having a first portion comprising a joiner flange and an opposing second portion comprising a pair of opposing coupling flanges, the first member having a plurality of first fastening apertures on the first portion thereof for coupling to the first component, and at least one groove extending longitudinally along the second portion of the first member on at least one of the coupling flanges, the first member further having a plurality of elongate first shock attenuation apertures integrally formed on the first portion thereof laterally disposed between the at least one groove and the plurality of first fastening apertures;
    a second longitudinally extending member having a third portion fixedly coupled between and coupled to the pair of coupling flanges and an opposing fourth portion comprising a plurality of second fastening apertures for coupling to the second component; and,
    an explosive member disposed between the pair of coupling flanges adjacent the at least one groove;
    wherein each of the plurality of shock attenuating apertures lies in a shock wave path between the explosive member and a respective one of the plurality of first fastening apertures, such that a shock wave created by activating the explosive member does not travel directly to the plurality of first fastening apertures.

14. The system of claim 13 wherein the second member further has a plurality of second shock attenuation apertures formed integrally therein, each of the plurality of second shock attenuation apertures being disposed laterally between the plurality of second fastening apertures and the at least one groove.

15. The system of claim 13 wherein the plurality of first shock attenuation apertures define a plurality of shock wave paths, each of the plurality of shock wave paths extending between the plurality of first shock attenuation apertures, the plurality of first fastening apertures being disposed between adjoining shock wave paths, wherein each of the shock wave paths is disposed on a portion of the system that the shock wave is transmitted through in response to activation of the explosive member.

16. The separation system of claim 15 wherein the plurality of shock attenuation apertures include a least one row of slots.

* * * * *